(12) United States Patent
Mishan

(10) Patent No.: US 11,732,826 B2
(45) Date of Patent: Aug. 22, 2023

(54) GARDEN HOSE WITH METAL SHEATH AND FABRIC COVER

(71) Applicant: E. MISHAN & SONS, INC., New York, NY (US)

(72) Inventor: Isaac Mishan, New York, NY (US)

(73) Assignee: E. MISHAN & SONS, INC., New York, NY (US)

( * ) Notice: Subject to any disclaimer, the term of this patent is extended or adjusted under 35 U.S.C. 154(b) by 156 days.

(21) Appl. No.: 17/521,376

(22) Filed: Nov. 8, 2021

(65) Prior Publication Data

US 2023/0145449 A1     May 11, 2023

(51) Int. Cl.
| | |
|---|---|
| *F16L 33/26* | (2006.01) |
| *F16L 33/22* | (2006.01) |
| *F16L 11/10* | (2006.01) |
| *F16L 13/14* | (2006.01) |
| *F16L 33/00* | (2006.01) |

(Continued)

(52) U.S. Cl.
CPC .............. *F16L 33/223* (2013.01); *F16L 11/10* (2013.01); *F16L 13/147* (2013.01); *F16L 33/003* (2013.01); *F16L 33/01* (2013.01); *F16L 33/2078* (2013.01); *F16L 33/26* (2013.01); *F16L 35/005* (2013.01); *F16L 57/005* (2013.01); *F16L 57/02* (2013.01)

(58) Field of Classification Search
CPC . F16L 33/01; F16L 35/00; F16L 33/26; F16L 33/224
USPC ........ 138/109, 118, 119, 129, 133–135, 138; 285/256, 903
See application file for complete search history.

(56) References Cited

U.S. PATENT DOCUMENTS

| | | | |
|---|---|---|---|
| 2,171,764 | A | 3/1935 | Ramsdell |
| 2,187,347 | A | 1/1940 | Guamaschelli |

(Continued)

FOREIGN PATENT DOCUMENTS

| | | |
|---|---|---|
| CN | 204201373 | 3/2015 |
| CN | 204554167 | 8/2015 |

(Continued)

OTHER PUBLICATIONS

XHose DAC-5 Website, retrieved Oct. 23, 2021.
Bionic Steel Hose Website, retrieved Oct. 26, 2021.
Bionic Force Hose Website, retrieved Oct. 26, 2021.

*Primary Examiner* — Patrick F Brinson
(74) *Attorney, Agent, or Firm* — Notaro, Michalos & Zaccaria P.C.

(57) ABSTRACT

A garden hose has an inner tube for conveying water at domestic water pressure from a first coupler disposed at a first end of the inner tube to a second coupler disposed at a second end of the inner tube, the inner tube being waterproof and flexible, the first coupler adapted to threadedly connect to a conventional water faucet and the second coupler adapted to threadedly connect to a conventional garden appliance. The hose has a metal sheath disposed over the inner tube and extending from the first coupler to the second coupler, the flexible metal sheath having a first shoulder near the first coupler and a second shoulder near the second coupler, the metal sheath being flexible, and a fabric sheath disposed over the metal sheath and fixed to the metal sheath by a first constricting band disposed at the first shoulder and a second constricting band disposed at the second shoulder.

12 Claims, 5 Drawing Sheets

(51) Int. Cl.
F16L 57/00 (2006.01)
F16L 33/207 (2006.01)
F16L 35/00 (2006.01)
F16L 57/02 (2006.01)
F16L 33/01 (2006.01)

(56) References Cited

U.S. PATENT DOCUMENTS

| | | |
|---|---|---|
| 2,797,474 A | 1/1957 | Main, Jr. |
| 3,623,513 A | 11/1971 | Dinkelkamp |
| 3,682,203 A | 8/1972 | Foti |
| 3,857,415 A * | 12/1974 | Morin ............... F16L 11/115 138/125 |
| 4,197,728 A | 4/1980 | McGowen |
| 4,603,888 A | 8/1986 | Goodall |
| 4,620,569 A | 11/1986 | von Glanstatten |
| 4,683,917 A | 4/1987 | Bartholomew |
| 4,669,757 A | 6/1987 | Bartholomew |
| D296,355 S | 6/1988 | Kanao |
| D296,356 S | 6/1988 | Kanao |
| 5,638,869 A | 6/1997 | Zaborszki |
| 5,669,420 A | 9/1997 | Herrero |
| 6,053,212 A | 4/2000 | Thomas |
| 6,106,027 A | 8/2000 | Mulvey |
| 6,155,303 A | 12/2000 | Krawietz |
| 6,311,736 B2 | 11/2001 | Herman |
| 6,386,594 B1 | 5/2002 | Schuttler |
| 6,427,727 B1 | 8/2002 | Thomas |
| 6,488,052 B2 | 12/2002 | Hupertz |
| 6,513,552 B1 | 2/2003 | Shepard |
| 6,543,488 B2 | 4/2003 | Foti |
| D488,544 S | 4/2004 | Akaltan |
| 6,729,355 B2 | 5/2004 | Vohrer |
| 6,817,082 B2 | 11/2004 | Grepaly |
| 6,971,414 B2 | 12/2005 | Vohrer |
| 7,066,497 B2 | 6/2006 | Fullbeck |
| 7,121,591 B2 | 10/2006 | Foti |
| 7,418,770 B2 | 9/2008 | Steingass |
| D586,435 S | 2/2009 | Reckseen |
| D611,576 S | 3/2010 | Tokuno |
| 7,735,524 B2 | 6/2010 | Burke |
| 8,079,619 B2 | 12/2011 | Witz |
| 8,082,954 B2 | 12/2011 | Rytter |
| 8,291,942 B2 | 10/2012 | Berardi |
| D671,196 S | 11/2012 | Montalvo |
| D687,513 S | 8/2013 | Williams et al. |
| 8,757,213 B2 | 6/2014 | Berardi |
| 8,776,836 B2 | 7/2014 | Ragner |
| 8,888,139 B2 | 11/2014 | Hunter |
| 8,936,046 B2 | 1/2015 | Ragner |
| D748,763 S | 2/2016 | Berardi |
| D748,764 S | 2/2016 | Berardi |
| 9,441,766 B2 | 9/2016 | Witz |
| D777,888 S | 1/2017 | Vaz |
| D782,623 S | 3/2017 | Vaz |
| D784,497 S | 4/2017 | Vaz |
| D785,141 S | 4/2017 | Vaz |
| 9,625,071 B2 | 4/2017 | Melo |
| 9,638,359 B2 | 5/2017 | Rothfuss |
| 9,815,254 B2 | 11/2017 | Blanchette |
| 9,844,921 B2 | 12/2017 | Ragner |
| 10,267,437 B2 | 4/2019 | Yeiser |
| 10,591,098 B2 | 3/2020 | Zhang |
| D918,350 S | 5/2021 | Dai |
| 2005/0023830 A1 | 2/2005 | Chung |
| 2007/0079885 A1 | 4/2007 | Zaborszki |
| 2008/0029178 A1 * | 2/2008 | Bentley ............... F16L 11/125 138/109 |
| 2008/0110518 A1 | 5/2008 | Hamilton |
| 2010/0154912 A1 | 6/2010 | Wu |
| 2010/0154915 A1 | 6/2010 | Wu |
| 2011/0247714 A1 | 10/2011 | Kanao |
| 2012/0234424 A1 | 9/2012 | Bernhardt |
| 2016/0138737 A1 | 5/2016 | Hariram |
| 2019/0093797 A1 | 3/2019 | Dai |

FOREIGN PATENT DOCUMENTS

| | | |
|---|---|---|
| DE | 202017107443 | 2/2018 |
| EP | 3460304 | 9/2018 |

* cited by examiner

GARDEN HOSE WITH METAL SHEATH AND FABRIC COVER

FIELD AND BACKGROUND OF THE INVENTION

The subject technology relates to garden hoses for residential and commercial use. Garden hoses having a flexible outer sheath of spirally wound metal are known from, for example, U.S. Pat. No. 10,591,098 for "Garden Hose with Metal Sheath," which is assigned to the assignee of the present application and is incorporated by reference for all purposes.

The present inventor has discovered that garden hoses with a bare metal sheath may scratch surfaces of furniture and other objects in the environment when in use, and may also develop a slippery surface especially when wet.

SUMMARY OF THE INVENTION

According to an aspect of the subject technology, a garden hose with a metal sheath, for example a garden hose as described in U.S. Pat. No. 10,591,098, is provided with a fabric outer sheath over the metal sheath, along the length of the metal sheath. The fabric hose is retained in place by a constricting band applied around the fabric sheath at or near, at least, each end of the fabric sheath. In an embodiment, each band is disposed adjacent to a shoulder-like feature of the underlying steel sheath having a larger diameter than the constricting band.

DETAILED DESCRIPTION OF THE INVENTION

Figure 1:
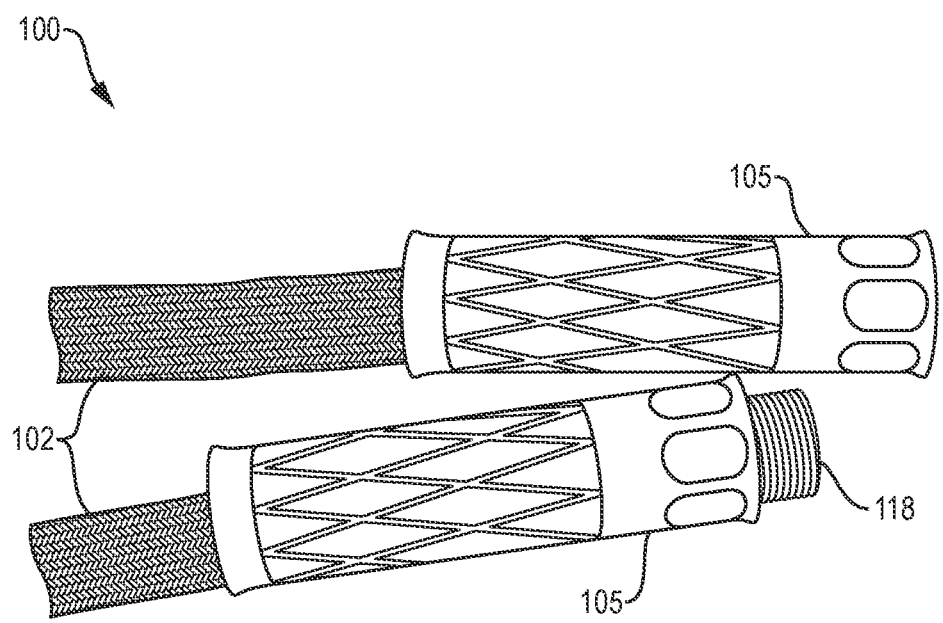
FIG. 1 is a view of the end portions of a garden hose according to a non-limiting embodiment of the subject technology.
Figure 2:
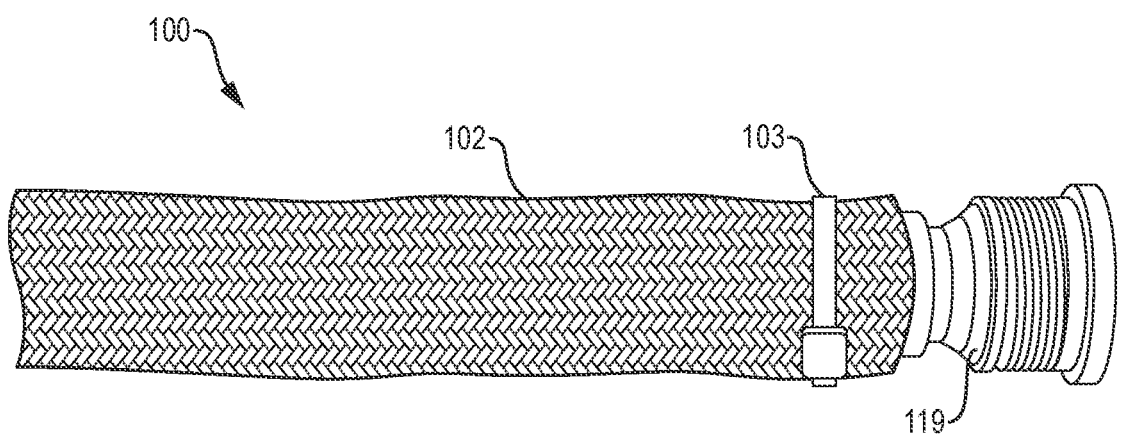
FIG. 2 is a view of an end portion of the garden hose of FIG. 1 with the end grip removed to show the attachment of a constricting band.
Figure 3:
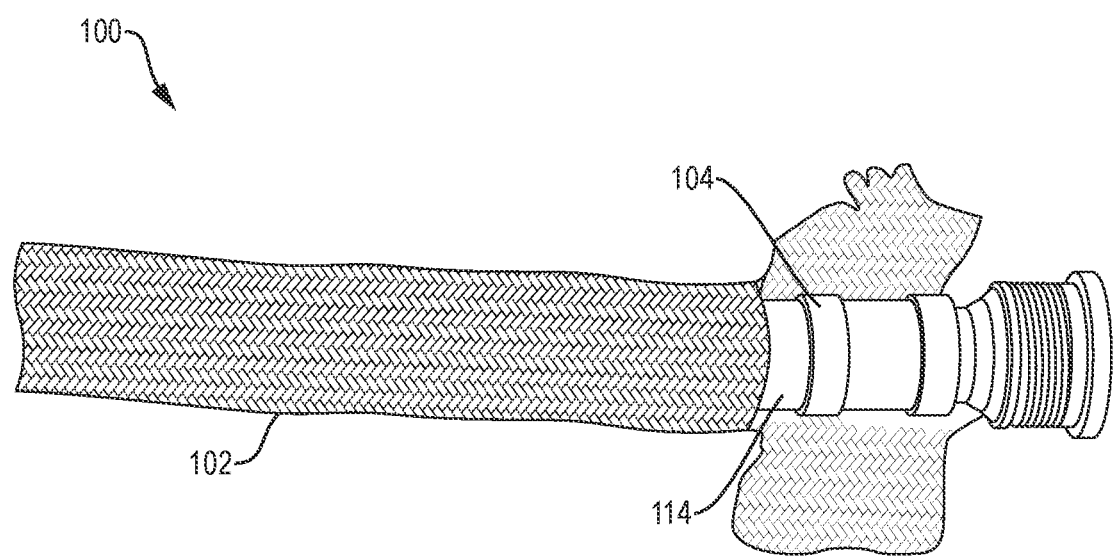
FIG. 3 is a view of an end portion of the garden hose of FIG. 2 with the constricting band removed and fabric sheath sliced open to show the underlying structure of the metal sheath.

According to a non-limiting embodiment of the subject technology, as shown in FIGS. 1-3, hose 100 is a garden hose with a steel sheath which may be constructed, for example, as in U.S. Pat. No. 10,591,098. Other constructions of a garden hose with steel sheath may be improved by the subject technology. In FIGS. 1-3, only the respective ends of the hose 100 are shown, but it should be understood that hose 100 is a continuous garden hose. Hose 100 may have any suitable length for a garden hose, for example, 25 feet, 50 feet, 75 feet, or 100 feet. Sheath 114 may be in the form of spirally wound turns of sheet metal, with each turn interlinked with a next turn along the hose body to form a flexible metal sheath.

According to an embodiment of the subject technology, as best shown in FIGS. 1-3, woven fabric sheath 102 is disposed over steel sheath 114. Fabric sheath 102 may be a continuous seamless tube of fabric material or may be formed as a sheet of fabric material with opposite edges joined at a seam running the length of the sheath to result in a tube of fabric material. The fabric material may be natural fabric, or synthetic fabric, or a natural-synthetic fabric blend. The fabric material may be, for example, cotton, wool, linen, silk, nylon, acrylic, polyester, polyolefin, Kevlar®, aramid, or blends of the foregoing. The fabric may comprise a hydrophobic coating on its outer surface, inner surface, or both. The fabric may comprise two or more layers of fabric bonded together to form a composite fabric. The two or more layers may be the same fabric, or different fabrics, and may have a hydrophobic coating on a surface. In an embodiment the fabric is 1250 denier polyester. In an embodiment the fabric is 1500 denier polyester. In an embodiment the fabric is DAC-5 fiber fabric.

Constricting band 103 is disposed on the outside of fabric sheath 102 and is tightly fitted to pin fabric sheath 102 against sheath 114 and in place on hose 100. Constricting band 103 is disposed adjacent to a shoulder 104 of steel sheath 114 the shoulder having a larger diameter at its largest extent than band 103. Any suitable shoulder-like feature of steel sheath 114 disposed near ends of the steel sheath 114 may be used for this purpose.

Constricting band 103 may be in the form of a band or bands, rope or ropes, or wire or wires, made of nylon, metal, or any other suitable material. In an embodiment, constricting band 103 is disposed between steel sheath 114 and grip 105, so the band 103 is beneath the grip and thus not directly exposed to the environment of use. Preferably, band 103 is disposed on the side of shoulder 104 nearest the end of hose 100, because in use, the forces imparted to hose 100 will tend to pull fabric sheath 102 down the length of hose 100 and away from the respective ends. It will be understood that each end of fabric sheath 102 is fixed in place at each respective end of hose 100 by a respective band 103.

In an embodiment, fabric sheath 102 is not fixed or attached to metal sheath 114 except by the constricting bands 103, so that it is free to slide and bunch somewhat along the length of hose 100 with respect to metal sheath 114, between the bands 103. This feature results in improved flexibility of hose 100.

In an embodiment, there are no additional layers or sheathes of material between fabric sheath 102 and metal sheath 114.

Within metal sheath 114, an inner tube of flexible polymer material is inside the hose 100 and extends the length of the hose between couplers 118, 119, for conveying water through the hose 100. Metal sheath 114 also extends the length of the hose between couplers 118, 119 to protect the inner tube. In the embodiment shown in FIGS. 1-3, coupler 118 is a male coupler and coupler 119 is a female coupler. One of the couplers 118, 119 is adapted to threadedly connect to a conventional residential water faucet, the other of the couplers 118, 119 is adapted to threadedly connect to a conventional garden appliance such as a sprinkler, wand, sprayer, or the like. In an embodiment, polymer grips or sleeves 105 are provided at the ends of hose 100, for example threadedly attached to couplers 118, 119 and extending from the respective coupler 118, 119 for a portion of the length of the hose 100. (In FIG. 1, coupler 119 is not visible because it is disposed within the respective grip 105.)

The inner tube may be made of made of a clear vinyl but other flexible, clear, translucent or opaque, colored or non-colored polymer tubing may be used, as long as it is waterproof and strong enough to withstand domestic, commercial or industrial water pressure (i.e, 45 psi-80 psi) from within. Preferably the inner tube is flexible and water-containing without perforations. The burst pressure of hose 100 may be above 80 p.s.i. In other embodiments, the burst pressure of hose 100 may be in the range of 180-320 p.s.i.

Preferably, hose 100 and its components, inner tube, metal sheath 114, and fabric sheath 102 are not adapted to convey or contain high-pressure fluid, such as in a hydraulic system, where working pressures may be in the thousands of p.s.i. Such a robust construction is not required or even desirable for domestic, commercial or industrial water hoses such as garden hoses, due to the expense and complexity required to achieve high burst pressures. Preferably, the burst pressure of hose 100 is less than 1,000 p.s.i., less than 500 p.s.i., or less than 100 p.s.i.

Figure 4:
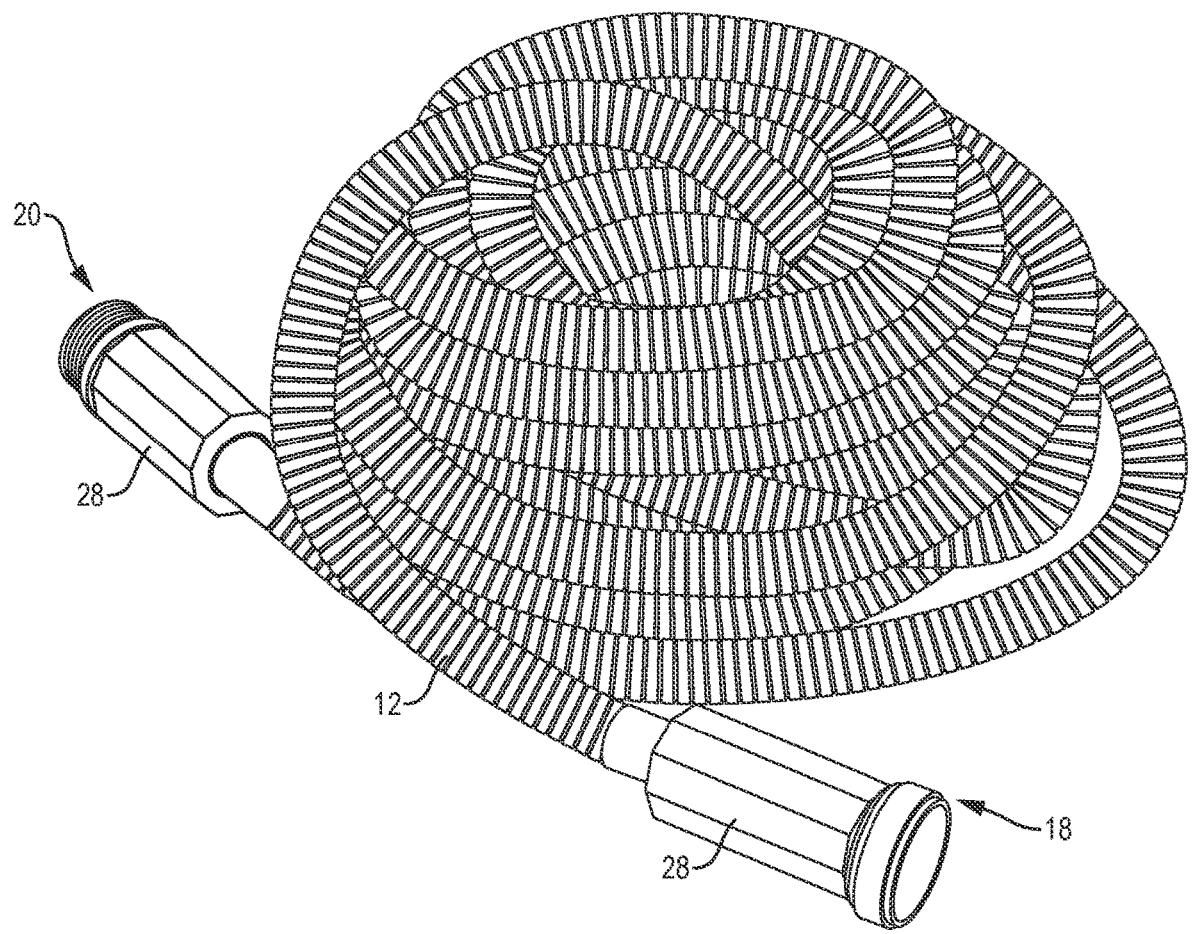
FIG. 4 is a perspective view of a garden hose with metal sheath from prior-art U.S. Pat. No. 10,591,098.
Figure 5:
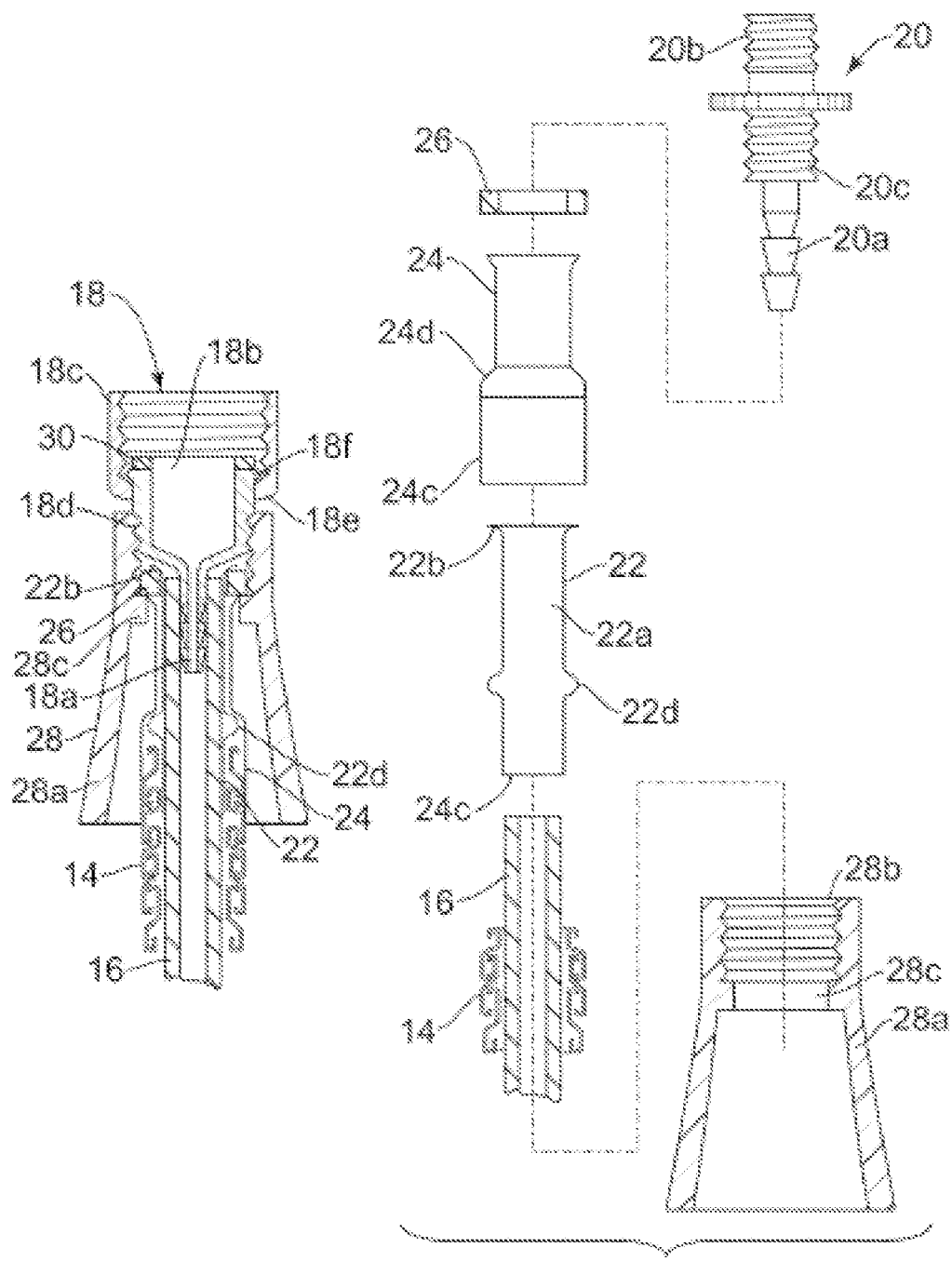
FIG. 5 is a section view of the ends of the prior-art hose of FIG. 4.

FIGS. 4 and 5 show an embodiment of a garden hose with a steel sheath from U.S. Pat. No. 10,591,098, which is a non-limiting example of such a hose which may be protected by a fabric sheath of the subject technology. The garden hose comprises a hose body 12 of at least about 10 feet in length, but longer for practical use as a water hose in residential, commercial and/or industrial environments. A first coupler 18 is firmly connected to one end of the hose body for connecting the garden hose to a water source, typically a water faucet, and a second coupler 20 is firmly connected to the opposite end of the hose body for discharging water from the garden hose. Typically, in the United States, the first coupler 18 is a female threaded coupler that can be screwed onto the male threads of a male faucet connection and the second coupler 20 is typically a male threaded coupler that is the same as the faucet connection. Alternative couplers that are threaded or not threaded, and/or snap on and off a mating faucet, and may be male or female may be used within the invention, depending on the convention that is prevalent in the region of use.

FIG. 5 shows a cross-section of ends portion of the example garden hose with a metal sheath. The hose body comprises a metal sheath 14 which is made of spirally wound turns of sheet metal, with each turn interlinked with a next turn along the hose body so that the turns are capable of moving with respect to each other to render the hose body flexible. The material of sheath 14 may alternatively be another type of sufficiently flexible metal or even a hard but somewhat flexible plastic such as polycarbonate or the like. An inner tube 16 of flexible polymer material is inside the hose and extends the length of the hose between the couplers. Inner tube 16 may be made of made of a clear vinyl but other flexible, clear, translucent or opaque, colored or non-colored polymer tubing may be used, as long as it is waterproof and strong enough to withstand domestic, commercial or industrial water pressure from within. Couplers 18 and 20, each made of metal or strong plastic, have a nipple 18a and 20a, press fit into one respective end of the inner tube 16.

In FIG. 5, a pair of coupler structures are provided, each for connecting one of the couplers 18 and 20, to respective ends of the metal sheath 14. For this purpose, each coupler structure comprises an inner metal shell 22, preferably of metal such as stainless steel, having an inner hollow cylindrical body 22a engaged over one end of the inner tube 16, the inner cylindrical body 22a having a flared end 22b press fit over the one end of the inner tube 16 into which the nipples 18a or 20a are inserted. The inner cylindrical body 22a also has an opposite unflared end 22c and includes an annular enlargement 22d between the ends thereof, with at least a portion of the inner cylindrical body 22a including the opposite unflared end 22c, being inside one end of the metal sheath 14.

In FIG. 5, each coupler structure also includes an outer metal shell 24 of metal, again preferably stainless steel, having an outer hollow cylindrical body 24a engaged over the inner cylindrical body 22a. The outer hollow cylindrical body 24a having a flared end 24b adjacent to, but spaced outwardly of the flared end 22b of the inner cylindrical body 22a. The outer hollow cylindrical body 24a has a large diameter portion 24d and an opposite unflared end 24c at the large diameter portion 24d, the large diameter portion 24d being over the annular enlargement 22d of the inner hollow cylindrical body 22a and the portion of the inner cylindrical body that is inside the one end of the metal sheath 14.

In FIG. 5, a fixing washer 26 is provided in the space between the flared ends 22b and 24b of the inner and outer cylindrical bodies 22a, 24a. The large diameter portion 24d and unflared end 24c of the outer hollow cylindrical body 24a is press fit radially inwardly to the annular enlargement 22d and the unflared end 22c of the inner hollow cylindrical body 22a with the one end of the metal sheath 14 being between portions of the inner and outer shells 22 and 24, for positively fixing the shells to the metal sheath 14. To this end the end of the sheath 14 may even extend to the space between the large diameter portion 24d and the annular enlargement 22d.

In FIG. 5, each coupler structure also includes hollow sleeve 28 having a body 28a extending around the outer metal shell 24 and one end 28b fixed to one of the couplers, the body 28a of the hollow sleeve 28 having a inner small diameter ring or step portion 28c engaged behind the fixing washer 26 for positively securing the shells 22 and 24, and therefore the ends of inner and outer hose parts 14 and 16, to the couplers 18 and 20. To this end, the sleeve 28 has a female thread 28b that is securely threaded to a male threaded portion 18d and 20c of the respective coupler 18 and 20.

The preferred first coupler 18 for use in the United States, is a female coupler with a fixed portion 18b connected to the first nipple 18a, and a moveable, i.e. rotatable, portion 18c movably mounted to the fixed portion 18b, and a water sealing washer 30, made for example of soft polymer, engaged to the fixed portion for water sealing the first coupler to a source of water. The fixed and movable portions 18b and 18c each have interfering flanges 18e and 18f for trapping the movable portion 18c to the fixed portion 18b but allowing some axial and free rotational relative movement between these parts. Movable portion 18c of coupler 18 is internally threaded to be threadably connected to a water faucet.

While specific embodiments of the invention have been shown and described in detail to illustrate the application of the principles of the invention, it will be understood that the invention may be embodied otherwise without departing from such principles. It will also be understood that the present invention includes any combination of the features and elements disclosed herein and any combination of equivalent features. The exemplary embodiments shown herein are presented for the purposes of illustration only and are not meant to limit the scope of the invention.

What is claimed is:
1. A garden hose comprising:
a polymer inner tube for conveying water at domestic water pressure from a first coupler disposed at a first end of the inner tube to a second coupler disposed at a second end of the inner tube, the inner tube being waterproof and flexible;

the first coupler adapted to threadedly connect to a conventional water faucet and the second coupler adapted to threadedly connect to a conventional garden appliance;

a metal sheath disposed over the inner tube and extending from the first coupler to the second coupler, the metal sheath having a first shoulder near the first coupler and a second shoulder near the second coupler, the metal sheath being flexible;

a fabric sheath disposed over the metal sheath and fixed to the metal sheath by a first constricting band disposed at the first shoulder and a second constricting band disposed at the second shoulder.

2. The garden hose of claim 1 wherein the fabric sheath is not fixed or attached to the metal sheath except by the first constricting band and second constricting band, such that the fabric sheath is free to slide and bunch along the length of the garden hose with respect to the metal sheath between the first constricting band and second constricting band.

3. The garden hose of claim 1 wherein the garden hose has a burst pressure of less than 100 p.s.i.

4. The garden hose of claim 1 wherein there are no additional layers or sheathes of material between the fabric sheath and the metal sheath.

5. The garden hose of claim 1 wherein the fabric sheath has a hydrophobic coating.

6. The garden hose of claim 1 wherein the fabric sheath is a composite material of two or more layers of fabric material bonded together.

7. The garden hose of claim 1 wherein the fabric sheath comprises 1250 denier polyester fabric, 1500 denier polyester fabric, or DAC-5 fiber fabric.

8. The garden hose of claim 1 wherein the metal sheath comprises stainless steel.

9. The garden hose of claim 1 wherein the fabric sheath comprises cotton, wool, linen, silk, nylon, acrylic, polyester, polyolefin, Kevlar® aramid, or blends of the foregoing.

10. The garden hose of claim 1 wherein the first constricting band is disposed between the first shoulder and the first coupler and the second constricting band disposed between the second shoulder and the second coupler.

11. The garden hose of claim 1 wherein the first and second constricting band are nylon strips.

12. The garden hose of claim 1 wherein the first coupler has a first nipple press fit into a first end of the inner tube, the first coupler connected to the metal sheath by a structure comprising:

an inner metal shell having an inner cylindrical body which is hollow and is engaged over one end of the inner tube, the inner cylindrical body having a flared end press fit over the first end of the inner tube and an opposite unflared end, the inner cylindrical body including an annular enlargement between the ends thereof, with at least a portion of the inner cylindrical body including the opposite unflared end being inside an end of the metal sheath;

an outer metal shell having an outer hollow cylindrical body engaged over the inner cylindrical body, the outer hollow cylindrical body having a flared end adjacent to but spaced outwardly of the flared end of the inner cylindrical body, the outer hollow cylindrical body having a large diameter portion and an opposite unflared end at the large diameter portion, the large diameter portion disposed over the annular enlargement of the inner cylindrical body and the portion of the inner cylindrical body that is inside the one end of the metal sheath; and a fixing washer in the space between the flared ends of the inner and outer cylindrical bodies;

the large diameter portion and unflared end of the outer hollow cylindrical body being press fit radially to the annular enlargement and unflared end of the inner hollow cylindrical body with the one end of the metal sheath between portions of the inner and outer shells, for positively fixing the shells to the metal sheath; and a hollow sleeve having a body extending around the outer metal shell and one end fixed to one of the couplers, the body of the hollow sleeve having an inner small diameter ring portion engaged behind the fixing washer for positively securing the shells to the coupler.

* * * * *